P. M. HICKOK.
AUTOMOBILE DRIVING AXLE.
APPLICATION FILED MAR. 20, 1919.

1,331,565.

Patented Feb. 24, 1920.
2 SHEETS—SHEET 1.

INVENTOR
Phil M. Hickok,
BY
Strong & Townsend
ATTORNEYS

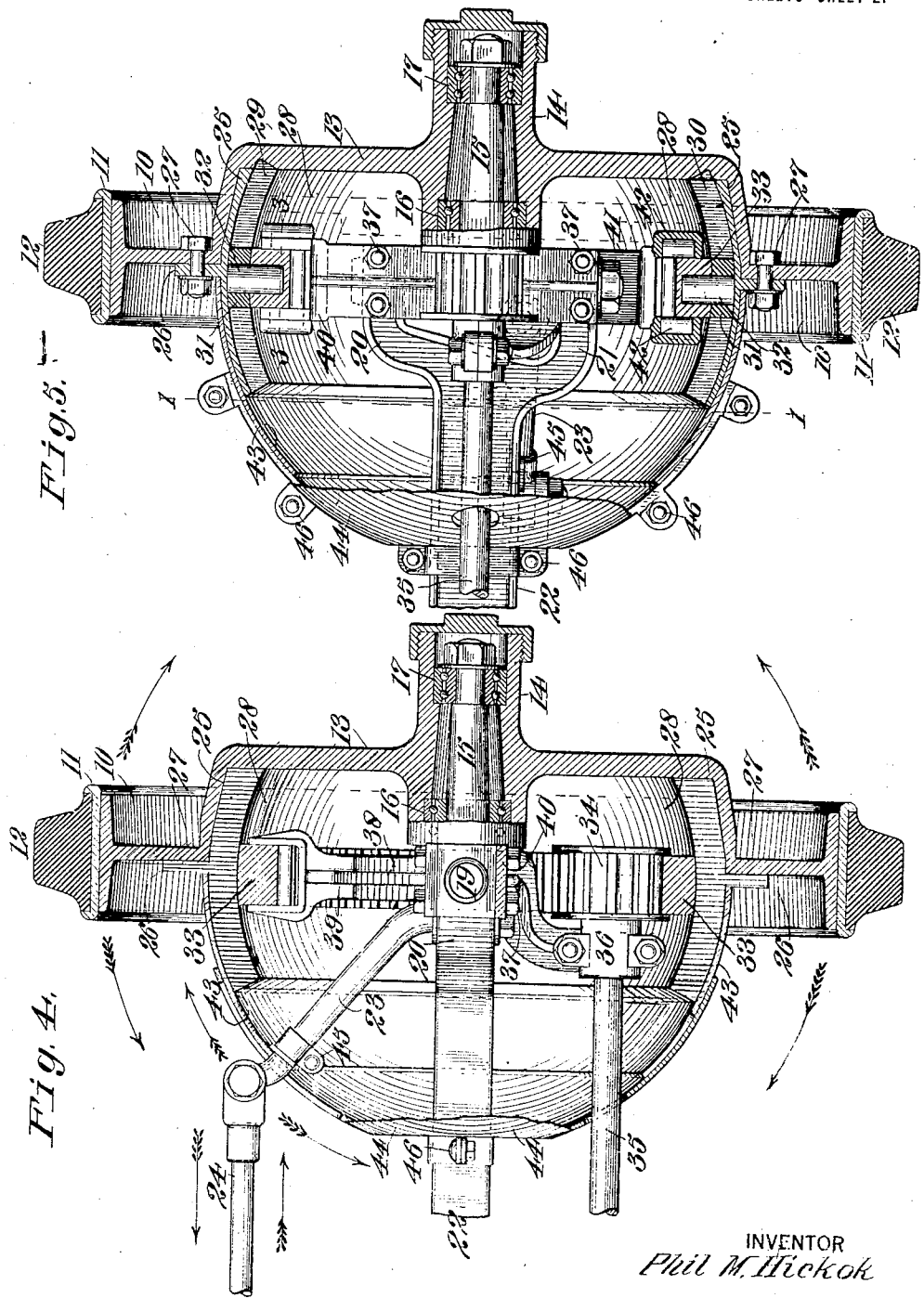

UNITED STATES PATENT OFFICE.

PHIL M. HICKOK, OF SAN JOSE, CALIFORNIA.

AUTOMOBILE DRIVING-AXLE.

1,331,565.   Specification of Letters Patent.   Patented Feb. 24, 1920.

Application filed March 20, 1919. Serial No. 283,806.

*To all whom it may concern:*

Be it known that I, PHIL M. HICKOK, a citizen of the United States, residing at San Jose, in the county of Santa Clara and State of California, have invented new and useful Improvements in Automobile Driving-Axles, of which the following is a specification.

This invention relates to a vehicle and particularly pertains to dirigible driving axles for automobiles.

It is the principal object of the present invention to provide an automobile axle with wheels which may be readily turned to guide the vehicle and which wheels may be consequently driven without interruption of the delivery of power thereto while pursuing a straight or curved course of travel.

The present invention contemplates the use of a fixed axle having forked ends upon which steering knuckles are mounted and which carry spindles for the support of vehicle wheels, said wheels having enlarged hubs inclosing a form of gearing which will permit the wheels to be constantly driven, irrespective of their angular disposition.

The invention is illustrated by way of example in the accompanying drawings, in which—

Fig. 4 is a view in horizontal section through the steering and driving mechanism, as seen on the line 4—4 of Fig. 1.

Fig. 5 is a view in vertical section through the mechanism, as seen on the line 5—5 of Fig. 1.

Figure 1:
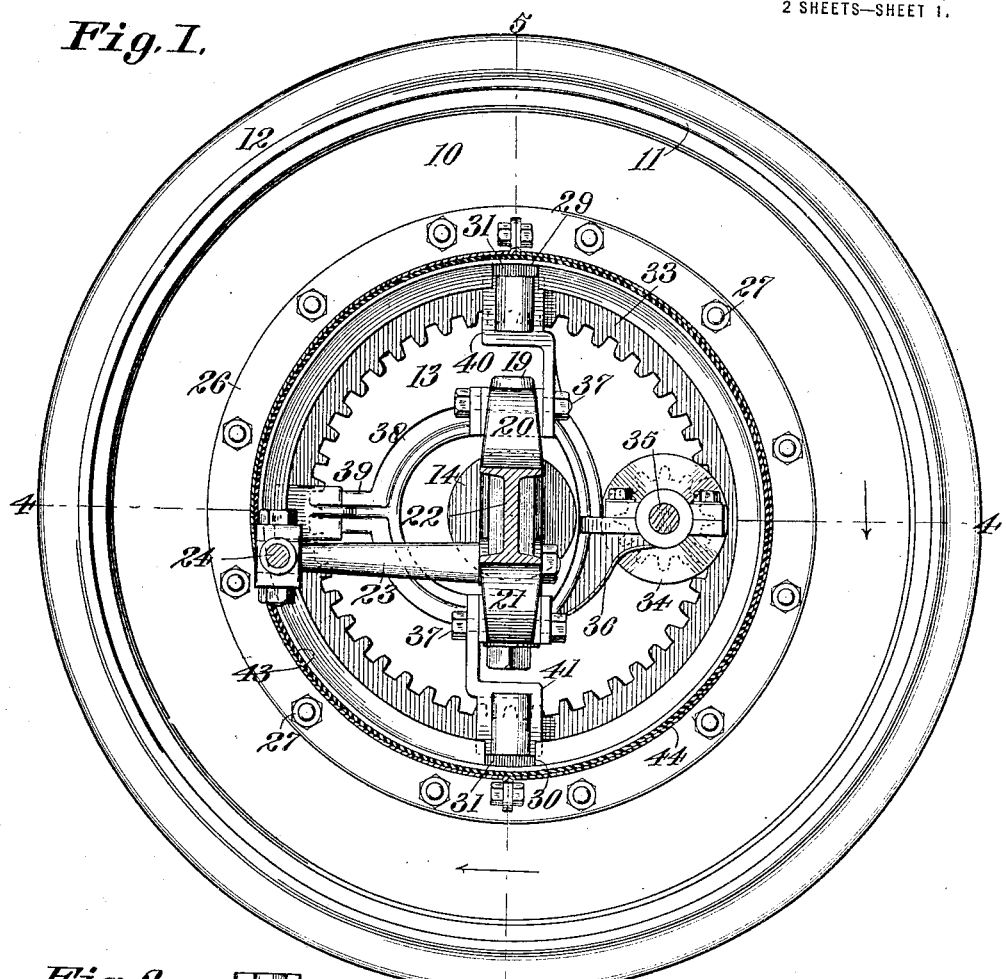
Figure 1 is a vertical section on line 1—1 of Fig. 5, showing the complete wheel and the driving structure as it appears on its inner face.
Figure 2:
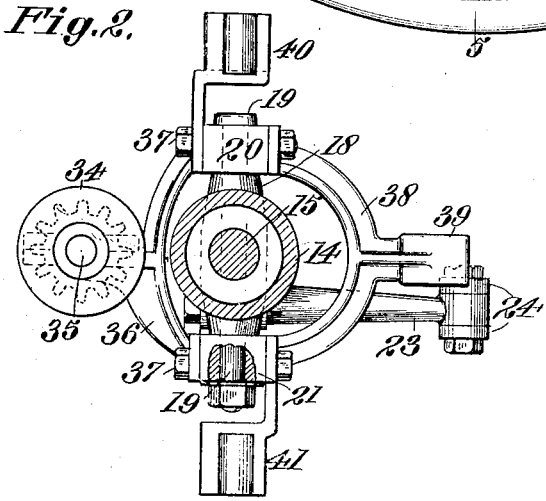
Fig. 2 is a fragmentary view in section and elevation, illustrating the gear mounting and the driving shaft support.

Referring more particularly to the drawings, 10 indicates the body portion of a vehicle wheel. This wheel is here shown as formed of metal and has an outer rim upon which a tire ring 11 may be mounted. This ring is provided to receive a tire of any desired design, as, for example, the solid rubber tire 12, as shown in Figs. 4 and 5. The central portion of the wheel 10 is enlarged and forms a drum 13. This drum is formed integral with a hub 14, through which an axle spindle extends. The hub carries suitable antifriction bearings 16 and 17 which are interposed between the hub and the spindle for the support of the wheel. The spindle 15 is formed integral with a steering knuckle 18 which is provided with a pivot pin 19. The steering knuckle is interposed between the arms 20 and 21 of the axle fork. The axle is here indicated by the numeral 22 and, it is understood, may be of any conventional design, it being one of the advantages of the present invention that it may be readily applied to automobile axles of standard construction.

The steering knuckle is provided with a steering arm 23 to which a suitable drag link 24 is pivotally secured. This drag link connects with one suitable steering mechanism and may be controlled by the movement of a steering hand wheel. The drum 13 is provided as a seat for a circular cage 25. This cage represents the equatorial section of a sphere and is fitted with bolting flanges 26 by which it is secured to the hub of the wheel by means of bolts 27. Mounted within the cage is a spheroidal bushing 28 which has its central axis in direct alinement with the axis of the pivot bolt 19, from which point the vehicle wheel swings. The bushing 28 is formed with two slots 29 and 30 upon diametrically opposite sides thereof, as shown in Fig. 5. These slots are arcuate and receive pin blocks 31. Blocks 31 are mounted upon pins 32. These pins are in longitudinal alinement with each other and radially aline with the center of the bushing. The inner ends of the pins extend into seats formed on the outer face of a ring driving gear 33. The outer face of this driving gear is shaped to conform to the spherical inner face of the bushing 29 and is thus free to rotate therein in any direction. The driving gear is clearly shown in Fig. 1 where it will be seen to be in constant mesh with the driving pinion 34. This pinion is fixed to the end of a driving shaft 35.

Figure 3:
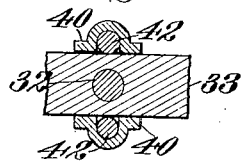
Fig. 3 is a view in section, as seen on the line 3—3, Fig. 5.

As shown in Fig. 4, the shaft extends through a supporting bracket 36 which has oppositely extending arms fastened to the upper and lower portions 20 and 21 of the axle fork by means of cap bolts 37 and a downwardly extending arm 41. The pinion 34 has enlarged side flanges adapted to overlap the sides of the ring gear and thus insure that the pinion and gear will be in constant mesh and in proper alinement. The ring gear is held in its alined position within the bushing 28 by means of a bracket 38. This bracket has a horizontally extending arm 39 and upper arms 40. Each of the arms 39, 40 and 41 is bifurcated and the fingers thereof extend upon the opposite sides of the ring gear, the member 39 having flat faces bearing directly against the sides of the ring gear and the arm portions 40 and 41 having rollers 42 resting against the faces of the ring gear, as particularly shown in Fig. 3.

Due to this construction, the ring gear will at all times be free to move between the fingers of the various supporting arms without a tendency to bind. It will be understood that if the case requires, other supporting arms could be provided which would hold the ring gear in axial alinement with its pivotal center, without restricting its driving motion. The outer face of the cage 25 is spherical and thus provides a suitable bearing surface for a dust cap 43. This cap forms an extension of the cage and its opened end is covered by an end cap 44 rigidly secured around the body of the axle 22. This will insure that the cap members 43 and 44 may telescope one within the other and have sliding contact with each other in a manner to exclude dirt from the driving mechanism and retain a lubricant therein.

It is, of course, necessary to provide slotted openings for the steering arm 23 and the driving shaft 35, the steering arm being fixed to the cap portion 43 by a strap fastening 45. In order to properly assemble the structure, the end cap 44 is split along its center and is fastened together by a plurality of bolts 46.

In operation of the present invention, the structure is assembled, as clearly shown in Figs. 4 and 5, it being understood that both ends of the axle 22 are alike and are fitted with a wheel and driving structure, as shown in the drawings.

Power may be delivered to the shaft 35 through suitable differential gearing or by any other desired means and will in turn rotate the driving pinion 34 and the ring gear in mesh therewith. This gear will act through the pins 32 to drive the wheel. When the vehicle is to be turned from its path of travel, the steering knuckle 18 and the spindle 15 are swung horizontally, thus acting to turn the wheel. This action is permitted, due to the fact that the blocks 31 may slide along the slots 29 and 30 of the spheroidal bushing 28. It will be evident that this construction will permit universal movement of the vehicle wheel, at the same time allowing it to be continuously and directly driven.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is—

1. In an axle construction, a driven member, a spheroidal bushing therein, a driven gear in the bushing having laterally movable connections therewith at diametrically opposite points, a driving gear meshing with the first gear, and a bracket support including radiating arms having bifurcated terminals straddling and guiding the driven gear.

2. In an axle construction, a rigid axle member, wheel spindles, one of which is pivoted to each end of the axle, freely rotating wheels supported upon said spindles, a driving drum formed as a part of each wheel, a spherical driving bushing mounted within each of said drums and having diametrically opposite circumferentially extending slots disposed along its vertical axial plane formed in its inner face, driving blocks slidable along said slots, a ring gear positioned within each of said bushings and free to move universally in relation thereto, pins extending from the opposite sides of the ring gear and engaging said blocks, fixed supporting fingers between which the ring gear is guided, and rigidly supported driving pinions in constant mesh with said ring gears.

3. In an axle construction, a rigid axle member, wheel spindles, one of which is pivoted to each end of the axle, freely rotating wheels supported upon said spindles, a driving drum formed as a part of each wheel, a spherical driving bushing mounted within each of said drums and having diametrically opposite circumferentially extending slots disposed along its vertical axial plane formed in its inner face, driving blocks slidable along said slots, a ring gear positioned within each of said bushings and free to move universally in relation thereto, pins extending from the opposite sides of the ring gears and engaging said blocks, fixed supporting fingers between which the ring gears are guided, rigidly supported driving pinions in constant mesh with said ring gears, and a telescopic cage adapted to close the opened end of each driving bushing.

4. In an axle construction, a rigid axle, a wheel spindle pivotally supported therefrom, a wheel hub rotatably supported thereon, a spheroidal bushing therein having diametrically disposed slots in the inner face thereof, sliding blocks in said slots, a ring gear circumscribed by said bushing and having trunnions extending into the blocks, guide arms carried by the axle for maintaining the ring gear in a proper alined position, a drive shaft supported from the axle, and a driving pinion in constant mesh with the ring gear.

5. In an axle construction, a driven member, a spheroidal bushing therein, a driven gear in the bushing having laterally movable connections therewith at diametrically opposite points, a driving gear meshing with the first gear, a rigid axle, a spindle pivoted to the latter and carrying the driven member, and a bracket secured to the axle and having arms bifurcated at their ends and straddling the driven gear for guiding the same.

6. In an axle construction, a driven member, a spheroidal bushing therein, a driven gear in the bushing having laterally movable connections therewith at diametrically opposite points, a driving gear meshing with the first gear, a rigid axle having a forked end, a spindle pivoted in the forked end of the axle and carrying the driven member, a drive shaft for the drive gear, a bracket secured to one side of the forked axle for supporting the shaft, and a tri-armed bracket secured to the opposite side of the forked axle and guidingly embracing the driven gear.

In testimony whereof I have hereunto set my hand in the presence of two subscribing witnesses.

PHIL M. HICKOK.

Witnesses:
　CORA B. PUGH,
　CHARLES A. PUGH.